Nov. 12, 1935.  J. TOUBORG  2,020,860
REFRIGERATING APPARATUS
Filed Jan. 11, 1935
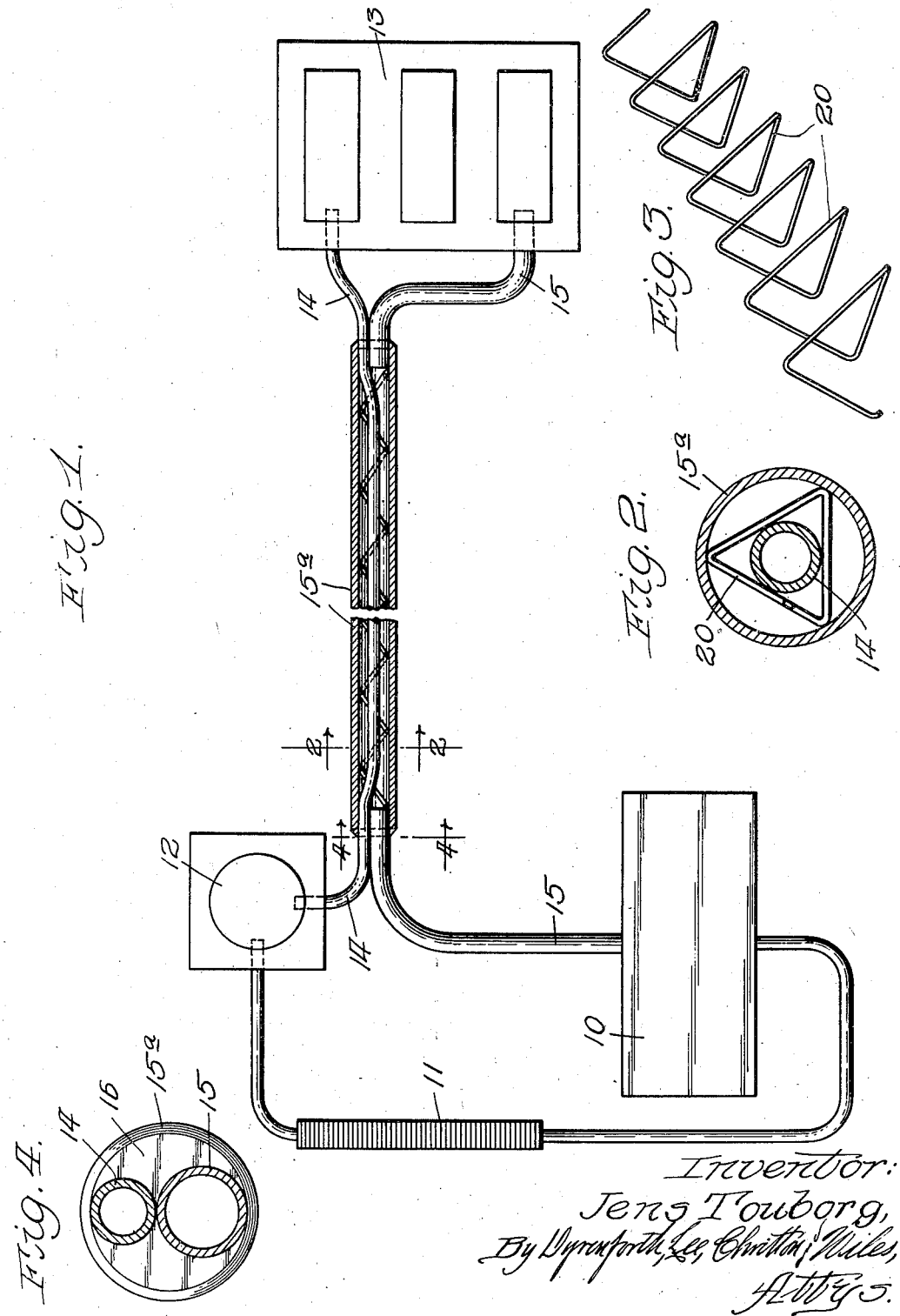
Inventor:
Jens Touborg,
By Dynrenforth, Lee, Chritton, Wiles,
Attys.

Patented Nov. 12, 1935

2,020,860

UNITED STATES PATENT OFFICE 2,020,860

REFRIGERATING APPARATUS

Jens Touborg, Greenville, Mich., assignor to Gibson Electric Refrigerator Corporation, Greenville, Mich., a corporation of Michigan Application January 11, 1935, Serial No. 1,388

8 Claims. (Cl. 62—115)

This invention relates to improvements in refrigerating apparatus and, more especially, a construction with means to prevent undesirable frosting of the refrigerant supply pipe leading from a float valve, expansion valve, capillary tube, or the like to the evaporator.

In many conventional types of refrigerators at present on the market, the evaporator is placed inside of the cooling compartment where space is somewhat limited. The compressor, condenser and other mechanical equipment are ordinarily placed in a separate compartment. This may be referred to for convenience as the machine compartment. In such a construction, it is necessary to lead the supply pipe from the machine compartment to the evaporator in the cooling compartment. It is well known that in conventional refrigerating apparatus using a compressor, condenser and evaporator there must be a control valve of some sort, or its equivalent, to control the flow of refrigerant from the condenser to the evaporator. This control valve, for example, may be in the form of a float valve, expansion valve, or even a capillary tube. For the purpose of illustrating this invention, I shall consider the control valve in general as in the form of a float valve.

In some constructions, the float valve is placed very close to or even inside of the evaporator. In such constructions, there is very little, if any, exposed pipe leading from the float valve to the evaporator and, consequently, practically no problem is presented of undesirable frosting on such supply pipe. Since the space in the cooling compartment is often limited, it may be impractical or undesirable to place the float valve close to or inside of the evaporator. If this is done, the evaporator may have to be unduly enlarged or valuable space in the cooling compartment is taken up by the float valve. Also, because of temperature conditions, space requirements and mechanical and other requirements, it may be impractical or undesirable to place the float valve close to or inside of the evaporator. If the float valve is not so placed, the only other convenient and practical location for it ordinarily is in the machine compartment. When so placed, however, there must necessarily extend a supply pipe from the float valve in the machine compartment to the evaporator in the cooling compartment. Since this pipe lies on the evaporator side of the control valve, it will become cold and undesirable or objectionable frost will accumulate upon it unless means are provided to prevent such frosting. The principal feature of this invention is the provision of means to prevent such frosting on the supply pipe.

In general, it may be stated that such objectionable frosting is prevented by insulating the supply pipe. This insulating is accomplished by running the supply pipe inside of the return pipe, the latter thereby serving as an insulator. Means are provided to space the supply pipe from the inner walls of the return pipe, as will be described in detail hereinafter.

In some constructions heretofore known where the control valve is located some distance from the evaporator, a loaded valve has been placed between the supply pipe and the evaporator, said valve adapted to open when the pressure of the liquid refrigerant in the supply pipe exceeds a predetermined value. This construction is illustrated, for example, in Peltier patent, No. 1,891,357, of December 20, 1932. Such a valve is designed to maintain the liquid in the supply pipe at such a pressure that evaporation will not take place; and this is designed to prevent objectionable frosting on the supply pipe. My improved construction shows another means for preventing such objectionable frosting without necessitating the use of such a loaded valve. Such a valve is expensive and presents questions of maintenance and repair. My improved means for preventing frosting is designed to overcome all the problems spoken of in the Peltier patent and will perform all the functions claimed for the loaded valve in such patent; and my improved means has no moving parts and can be easily and cheaply constructed.

In that form of device embodying the features of my invention shown in the accompanying drawing:—

Figure 1 is a diagrammatic view; Fig. 2 is an enlarged view taken as indicated by the line 2 of Fig. 1; Fig. 3 is a view of the spacing wire on an enlarged scale; and Fig. 4 is a view taken as indicated by the line 4 of Fig. 1.

As shown in the drawing, there is indicated diagrammatically in Fig. 1 a complete refrigerating circuit, including the compressor 10, condenser 11, float valve or refrigerant flow control means 12 and evaporator or refrigerator element 13. 14 indicates the supply pipe or conduit leading from the float valve to the evaporator and 15, the return pipe leading from the evaporator to the compressor.

As here shown, the return pipe 15 has an enlarged section 15a in the form of a pipe of larger diameter with circular end closure members 16, 16. The supply pipe 14 has an external diameter considerably smaller than the internal diameter of the pipe 15a and the supply pipe extends through the return pipe, as shown in the drawing. Suitable holes are provided in the plugs or closure members 16, 16 to accommodate the return pipe 14. Larger holes are also provided to accommodate the pipes 15, 15 at each end, the ends of said pipes 15 being open inside of the pipe 15a so that the latter virtually forms a part of the return pipe itself. That is, the refrigerant in the return circuit enters the pipe 15a at one end from the evaporator, flows through the pipe 15a around the supply pipe 14 and then leaves the pipe 15a through the other pipe 15 leading to the compressor 10.

By this construction, it will be seen that the pipe 14 is insulated by the return pipe 15a with the return flowing refrigerant therein. The returning refrigerant is warm enough to prevent frosting on the pipe 15a.

Means are provided for centering the pipe 14 inside of the pipe 15a. This includes a coil of wire 20, as shown in Fig. 3, the separate convolutions being triangular. This coil is wound around the pipe 14 when it is slipped into the pipe 15a and holds the pipe in concentric relationship with proper spacing between the same, as shown in Fig. 2.

As has been stated, the return pipe with the returning refrigerant therein insulates the supply pipe 14 to prevent undesirable frosting. The term "insulate" may not be used correctly in a highly technical sense, since it will be noticed that there is some heat exchange between the pipe 14 and the returning refrigerant in the pipe 15a. In many cases, however, it is believed that the temperature of the returning refrigerant will be lower than the temperature of the surrounding air to which the pipe 14 would be exposed if it were not located inside of the return pipe. The refrigerant in the pipe 14 will consequently be kept cooler by passing through the pipe 15a than if it were exposed in the conventional manner. This will result in an increased efficiency in the apparatus; and furthermore will prevent the objectionable frosting that otherwise would occur.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. In a refrigerating system of the compressor-condenser-evaporator type, the combination of a refrigerating element, a supply conduit for supplying liquid refrigerant to said element, means for supplying liquid refrigerant to said supply conduit, refrigerant flow control means between said means and said supply conduit, a return conduit for returning refrigerant from the refrigerating element, said return conduit surrounding said supply conduit and insulating the latter.

2. Apparatus as claimed in claim 1, in which the supply conduit lies inside of the return conduit, the outer wall of the supply conduit being spaced from the inner wall of the return conduit.

3. Apparatus as claimed in claim 1, in which the supply conduit lies inside of the return conduit, and in which means are provided for spacing the supply conduit from the return conduit.

4. Apparatus as claimed in claim 1, in which the supply conduit lies inside of the return conduit and in which means are provided for spacing the supply conduit from the return conduit, said means including a wire wound around the supply conduit.

5. Apparatus as claimed in claim 1, in which the supply conduit lies inside of the return conduit and in which means are proided for spacing the supply conduit from the return conduit, said means including a wire of polygonal form would wound around the supply conduit.

6. In a refrigerating system of the compressor-condenser-evaporator type, the combination of a refrigerating element, a supply conduit for supplying liquid refrigerant to said element, means for supplying liquid refrigerant to said supply conduit, refrigerant flow control means between said means and said supply conduit, a return conduit for returning refrigerant from the refrigerating element, said return conduit having a portion of its length lying inside of said enlarged section of said return conduit.

7. In a refrigerating system of the compressor-condenser-evaporator type with flow control means located a considerable distance from the evaporator and a supply pipe connecting said flow control means and said evaporator; a refrigerant return pipe leading from the evaporator and surrounding at least a portion of the supply pipe to insulate the same and prevent the formation of frost thereon.

8. In a refrigerating system of the compressor-condenser-evaporator type with flow control means located a considerable distance from the evaporator and a supply pipe connecting said flow control means and said evaporator; a refrigerant return pipe leading from the evaporator, with at least a portion of the supply pipe and a portion of the return pipe lying in such close relationship that objectionable frosting on said portion of said supply pipe is prevented.

JENS TOUBORG.